US008464160B2

(12) United States Patent
Sakata et al.

(10) Patent No.: US 8,464,160 B2
(45) Date of Patent: Jun. 11, 2013

(54) USER INTERFACE DEVICE, USER INTERFACE METHOD, AND RECORDING MEDIUM

(75) Inventors: Kotaro Sakata, Hyogo (JP); Shigenori Maeda, Kyoto (JP)

(73) Assignee: Panasonic Corporation, Osaka (JP)

( * ) Notice: Subject to any disclaimer, the term of this patent is extended or adjusted under 35 U.S.C. 154(b) by 345 days.

(21) Appl. No.: 12/744,558

(22) PCT Filed: Sep. 25, 2009

(86) PCT No.: PCT/JP2009/004868
§ 371 (c)(1),
(2), (4) Date: May 25, 2010

(87) PCT Pub. No.: WO2010/035477
PCT Pub. Date: Apr. 1, 2010

(65) Prior Publication Data
US 2010/0269072 A1    Oct. 21, 2010

(30) Foreign Application Priority Data

Sep. 29, 2008   (JP) ................................. 2008-250867

(51) Int. Cl.
*G06F 3/00* (2006.01)
(52) U.S. Cl.
USPC ............ 715/750; 715/863; 345/158; 345/178
(58) Field of Classification Search
USPC ................. 715/863, 750, 751, 761, 861, 862; 345/156–184
See application file for complete search history.

(56) References Cited

U.S. PATENT DOCUMENTS

| 6,006,188 | A  | * | 12/1999 | Bogdashevsky et al. ...... 704/270 |
| 6,195,104 | B1 | * | 2/2001  | Lyons ........................... 345/473 |
| 6,215,890 | B1 |   | 4/2001  | Matsuo et al. |
| 6,266,061 | B1 |   | 7/2001  | Doi et al. |
| 6,414,672 | B2 |   | 7/2002  | Rekimoto et al. |

(Continued)

FOREIGN PATENT DOCUMENTS

| CN | 1218936    | 6/1999 |
| CN | 101033955  | 9/2007 |

(Continued)

OTHER PUBLICATIONS

International Search Report issued Dec. 28, 2009 in International (PCT) Application No. PCT/JP2009/004868.

(Continued)

*Primary Examiner* — Doon Chow
*Assistant Examiner* — Christopher J Fibbi
(74) *Attorney, Agent, or Firm* — Wenderoth, Lind & Ponack, L.L.P.

(57) ABSTRACT

A user interface device (1) includes a display unit (2) which displays a first work space assigned to a user and a second work space different from the first workspace; a detection unit (3) which detects a position of the user; a calculation unit (4) which calculates an appropriate distance between the user and the second work space according to a type of an application program controlled by the user through the first work space; and a notification unit (5) which notifies the user that a distance between the position of the user detected by the detection unit (3) and the second work space is shorter than the appropriate distance calculated by the calculation unit (4).

6 Claims, 16 Drawing Sheets

U.S. PATENT DOCUMENTS

| | | | |
|---|---|---|---|
| 7,348,963 B2 * | 3/2008 | Bell | 345/156 |
| 2001/0012001 A1 | 8/2001 | Rekimoto et al. | |
| 2001/0024213 A1 | 9/2001 | Doi et al. | |
| 2006/0026298 A1 * | 2/2006 | Zeng et al. | 709/240 |
| 2008/0018595 A1 * | 1/2008 | Hildreth et al. | 345/156 |
| 2008/0117167 A1 * | 5/2008 | Aonuma et al. | 345/157 |
| 2008/0252596 A1 * | 10/2008 | Bell et al. | 345/156 |
| 2009/0077504 A1 * | 3/2009 | Bell et al. | 715/863 |
| 2009/0106667 A1 * | 4/2009 | Lyle et al. | 715/750 |

FOREIGN PATENT DOCUMENTS

| | | |
|---|---|---|
| JP | 3-177918 | 8/1991 |
| JP | 4-198985 | 7/1992 |
| JP | 9-114430 | 5/1997 |
| JP | 10-207619 | 8/1998 |
| JP | 11-3195 | 1/1999 |
| JP | 11-24839 | 1/1999 |
| JP | 2002-300601 | 10/2002 |
| JP | 2003-280817 | 10/2003 |
| JP | 3819096 | 9/2006 |
| JP | 2007-80228 | 3/2007 |

OTHER PUBLICATIONS

"Corporate Theater Presentation", 2008 International CES Panasonic Booth Info, Video Report, [online], Jan. 10, 2008, [retrieval date Dec. 16, 2009], Internet < URL http://panasonic.net/exhi bition/ces2008/videoreport.html, http://ch.panasonic.co.jp/contents/00978/player_8.htm1>.

* cited by examiner

Basic attribute information

| ID | Name | Gender | Age | Birthday | Relationship | ... |
|---|---|---|---|---|---|---|
| MA001 | Taro Matsushita | Male | 34 yrs | May 3 | Father | ... |
| MA002 | Hanako Matsushita | Female | 32 yrs | Dec. 21 | Mother | ... |
| MA003 | Daisuke Matsushita | Male | 5 yrs | Dec. 21 | Child | ... |
| ... | ... | ... | ... | ... | ... | ... |
| MA015 | Jiro Yamamoto | Male | 33 yrs | — | Friend of father | ... |
| ... | ... | ... | ... | ... | ... | ... |

Fig. 4C

Physical characteristic information

| ID | Standing height (eye height) | Sitting height (eye height) | Dominant hand | Dominant eye | Sight left/right | Audibility | ... |
|---|---|---|---|---|---|---|---|
| MA001 | 1.76(1.55) | 1.26(1.06) | Left | Left | 0.8/0.7 | Good | ... |
| MA002 | 1.65(1.43) | 1.16(1.23) | Right | Right | 0.9/0.9 | Good | ... |
| MA003 | 1.01(0.84) | 0.67(0.47) | Right | Right | 1.2/1.2 | Good | ... |
| ... | ... | ... | ... | ... | ... | ... | ... |
| MA015 | 1.82(1.62) | 1.29(1.43) | Right | Left | 0.3/0.3 | Weak (right) | ... |
| ... | ... | ... | ... | ... | ... | ... | ... |

Fig. 4D

Human relationship information (Friendliness table, 0.0 to 1.0: not friendly to friendly)

| ID | MA001 | MA002 | MA003 | ... | MA015 | ... |
|---|---|---|---|---|---|---|
| MA001 | 1.0 | 0.75 | 0.87 | ... | 0.95 | ... |
| MA002 | 0.82 | 1.0 | 0.76 | ... | 0.30 | ... |
| MA003 | 0.95 | 0.61 | 1.0 | ... | 0.28 | ... |
| ... | ... | ... | ... | ... | ... | ... |
| MA015 | 0.92 | 0.25 | 0.19 | ... | 1.0 | ... |
| ... | ... | ... | ... | ... | ... | ... |

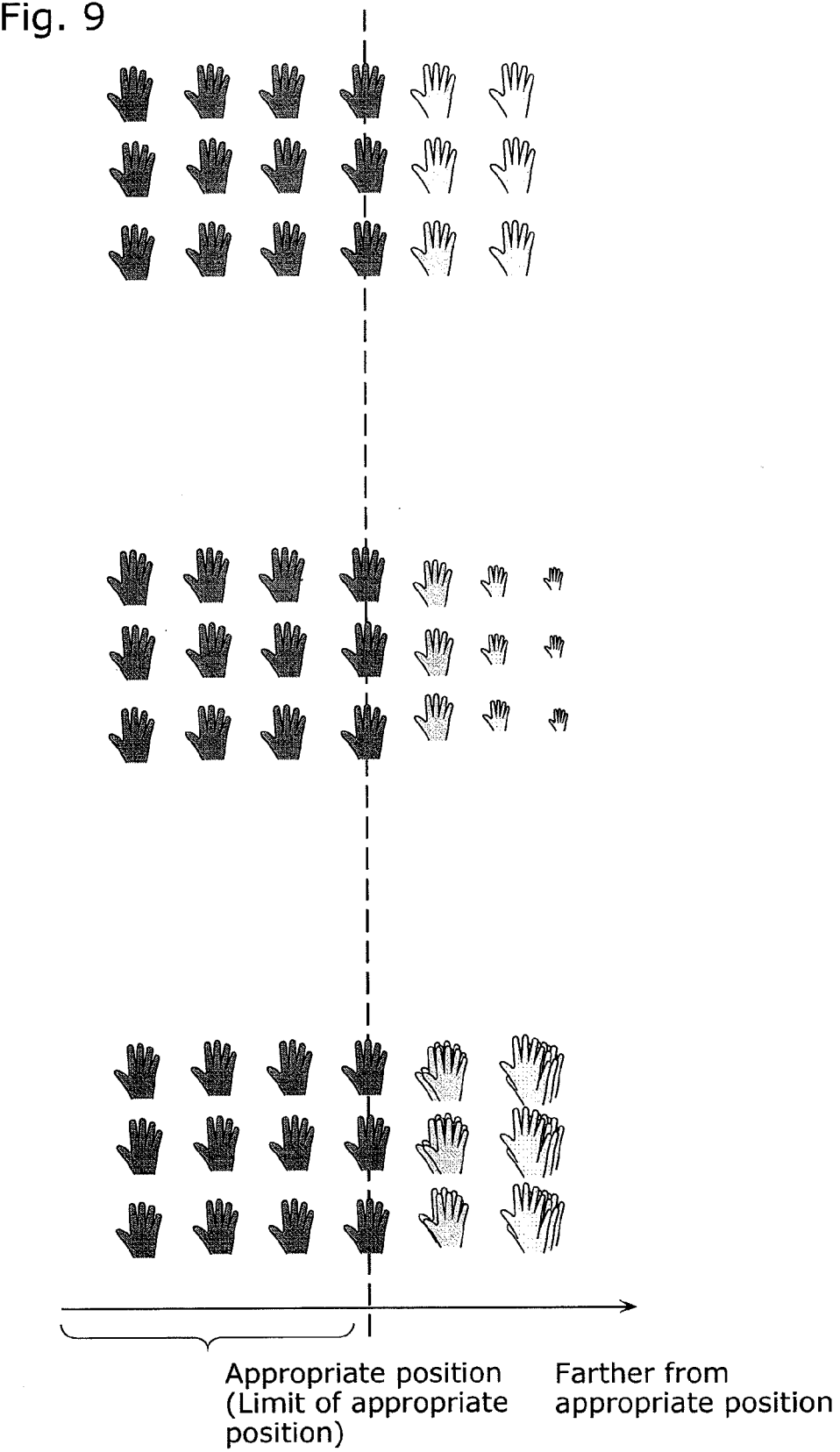

USER INTERFACE DEVICE, USER INTERFACE METHOD, AND RECORDING MEDIUM

TECHNICAL FIELD

The present invention relates to user interface devices for large screen displays operated by multiple people.

BACKGROUND ART

Along with an increase in screen size of and thinning of displays, not only have TVs been used to merely view broadcast contents, but also there has been an increasing possibility for new usage of the TVs such as simultaneous use of information items, browsing a large amount of information, communication with life-size presence, a bulletin board which always displays information, and interior decoration such as wallpaper or a frame.

In addition, along with introduce of home networking, sharing of a user's operation history or a situation detected by various apparatuses through a home network and sensing of a context or a situation of the user in a comprehensive manner is becoming a real possibility.

Under these circumstances, it is necessary to design more complex functions for simple use, in order to allow not only conventional programs and movies to be viewed but also the above new usage to be realized. For this purpose, it is necessary to realize a new operation method which allows an intuitive operation and an autonomous operation method which reduces an amount of a user's explicit operation and operational load by understanding a situation or intention of the user and anticipating an operation of the user based on user-sensing information. In addition, it is desirable to employ an input method and an operational system assuming operations by multiple people so as to be compatible with usage for not only passive viewing but also other purposes, while taking advantage of features of a TV set up in a space shared by a family, such as a living room.

As the new operation method to replace conventional use of a remote control, input apparatuses have been developed which allows a user to input intended information by simply making a gesture or a hand gesture, without an apparatus such as a remote control being held by the user and without equipping a special apparatus. For such input apparatuses, providing the user with appropriate feedback on the user's operation is important for high operability to the user.

For example, Patent Literature 1 cited below discloses a user interface device as an apparatus which provides a user with such feedback. The user interface device disclosed includes a unit which determines whether or not an object of image processing is within a proper image-processable range and a unit which displays at least one of specific visual information and auditory information when it is determined that the object is out of the proper range. On the user interface device, for example, a cursor is displayed smaller and/or lighter in color if the object is determined to be far off the proper range, displayed larger if the object is determined to be off but close to the proper range, and displayed with a left side deformed if the object is determined to be outside the proper range to the left.

[Citation List]
[Patent Literature]
[PTL 1] Japanese Patent No. 3819096

SUMMARY OF INVENTION

[Technical Problem]

In the conventional technique above, a light-receiving device for detecting an object is fixedly installed. This problematically limits the range within which a user's hand or the like can be detected without problems. In order to solve this problem, the user interface device using the conventional technique provides feedback on a deviation of a gesture input from the proper range according to a positional relationship between the user and the light-receiving unit. On the other hand, there is another method to solve this problem that a range in which an object is detectable is expanded by installing a plurality of light-receiving devices for detecting an object. Installing a plurality of light-receiving devices for detecting an object has become a real possibility because of increase in screen size of displays and popularization of cameras, so that a user can be provided with a sufficient operating range.

Furthermore, in the case where multiple users are present in front of the screen, the user interface device using the conventional technique does not provide the users with feedback based on consideration of a positional relationship between the users. In this case, there may be a problem that, for example, if multiple users in close positions each make a predetermined gesture which causes a menu to appear on the screen at the same time, one menu displayed on the display may overlay another. Furthermore, there may be a problem that, for example, if multiple users are each watching something or operating something in their own work space on a screen, one of the users may carelessly enter a neighboring work space of another user because of too much concentration on the own work space.

The present invention has been devised to solve the above conventional problems, and an objective of the present invention is to provide a user interface device which prevents interference between multiple processes performed in parallel on the user interface device.

[Solution to Problem]

A user interface device according to one embodiment of the present invention provides a user with a work space which serves as an interface for controlling an application program. More specifically, the user interface device includes: a display unit configured to display a first work space and a second work space, the first work space being assigned to the user, and the second work space being different from the first workspace; a detection unit configured to detect a position of the user; a calculation unit configured to calculate an appropriate distance between the user and the second work space, according to a type of the application program controlled by the user through the first work space; and a notification unit configured to notify the user that a distance between the position of the user detected by the detection unit and the second work space is shorter than the appropriate distance calculated by the calculation unit.

This configuration prevents the user in operation in the first work space from entering the second work space adjacent to the first work space by mistake. As a result, neighboring users in operation can keep an appropriate distance from each other. It is to be noted that the present invention is applicable not only to sharing of the user interface device by multiple users. For example, the second work space may be a system area which a user is not allowed to use.

Furthermore, the detection unit is further configured to detect a gesture made by the user for controlling the application program. The display unit is configured to display a feedback indication for transmitting validity of the gesture to the user, the feedback indication being displayed in a position corresponding to a position of the gesture detected by the detection unit. The notification unit is configured to notify the user that the distance between the position of the user and the second work space is shorter than the appropriate distance by changing appearance of the feedback indication.

Specifically, the notification unit may be configured to make the feedback indication smaller and/or lighter in color as the user comes closer to the second work space. This notifies the user in real time whether or not the user is keeping the appropriate distance. It is to be noted that the "user position" in the present description may be a position of a center of gravity of a user, or a position of a gesture (that is, a position of a hand making a gesture). The detection unit detects either one of these positions.

Furthermore, the first work space may be a window which moves on the display unit so as to follow a movement of the user. The notification unit may be configured to decrease followability of the window as the user comes closer to the second work space. This also notifies the user in real time whether or not the user is keeping the appropriate distance.

Furthermore, the calculation unit may be further configured to calculate the appropriate distance according to a physical characteristic of the user. For example, the calculation unit may be configured to calculate the appropriate distance so that the appropriate distance is longer as the body height of the user is greater or an arm of the user is longer. Alternatively, the calculation unit may be configured to calculate the appropriate distance so that the appropriate distance is longer when a hand of the user closer to the second work space is a dominant hand of the user than when a hand of the user farther from the second work space is a dominant hand of the user.

Furthermore, the calculation unit may be further configured to calculate the appropriate distance so that the appropriate distance is shorter when the application program controlled by the user through the first work space and an application program controlled by another user through the second work space are more similar or more relevant.

Furthermore, the calculation unit may be further configured to calculate the appropriate distance based on a relationship between the user operating in the first work space and another user operating in the second work space. For example, the calculation unit may be configured to calculate the appropriate distance so that the appropriate distance is shorter when the user is of a higher social status than the another user than when the user is of a lower social status than the another user.

Furthermore, the detection unit is further configured to detect utterances of the user and the another user. The calculation unit may be configured to presume the relationship between the user and the another user from amounts of the utterances detected by the detection unit.

For example, the notification unit may be configured to make an audible notification. The notification unit may be configured to make a notification using illumination. Furthermore, the notification unit may be configured to make a notification through a mobile device carried by the user.

A user interface method uses a display unit displaying a first work space and a second work space so as to allow a user to control an application program through the first work space, the first work space being assigned to the user, and the second work space being different from the first workspace.

Specifically, the user interface method includes: detecting a position of the user; calculating an appropriate distance between the user and the second work space according to a type of the application program controlled by the user through the first work space; and notifying the user that the distance between the position of the user detected in the detecting and the second work space is shorter than the appropriate distance calculated in the calculating.

On a computer-readable storage medium according to an embodiment of the present invention, the user interface method described above is recorded. Furthermore, the present invention may be implemented not only as a user interface device but also as a program which causes a computer to execute functions of the user interface device. It should be understood that the program may be distributed via a storage medium such as a CD-ROM or a transmission medium such as the Internet.

[Advantageous Effects Of Invention]

The user interface device according to the present invention prevents a user in operation in a first work space from entering a second work space adjacent to the first work space by mistake, by notifying the user that the user is too close to the second work space.

BRIEF DESCRIPTION OF DRAWINGS

FIG. 4C is a diagram showing an example of physical characteristic information included in the user information database.

FIG. 4D is a diagram showing an example of human relationship information included in the user information database.

FIG. 9 is a diagram showing an example of feedback provided by the user interface device according to the one embodiment of the present invention.

DESCRIPTION OF EMBODIMENT

One embodiment of the present invention will be described below with reference to drawings.

1. Summary

A user interface device of the present invention is an apparatus which allows users, for example, to each control an application program (hereinafter referred to as an application) in a work space which is a segment of an image display unit and assigned to each of the users.

2. Configuration

Figure 1A:
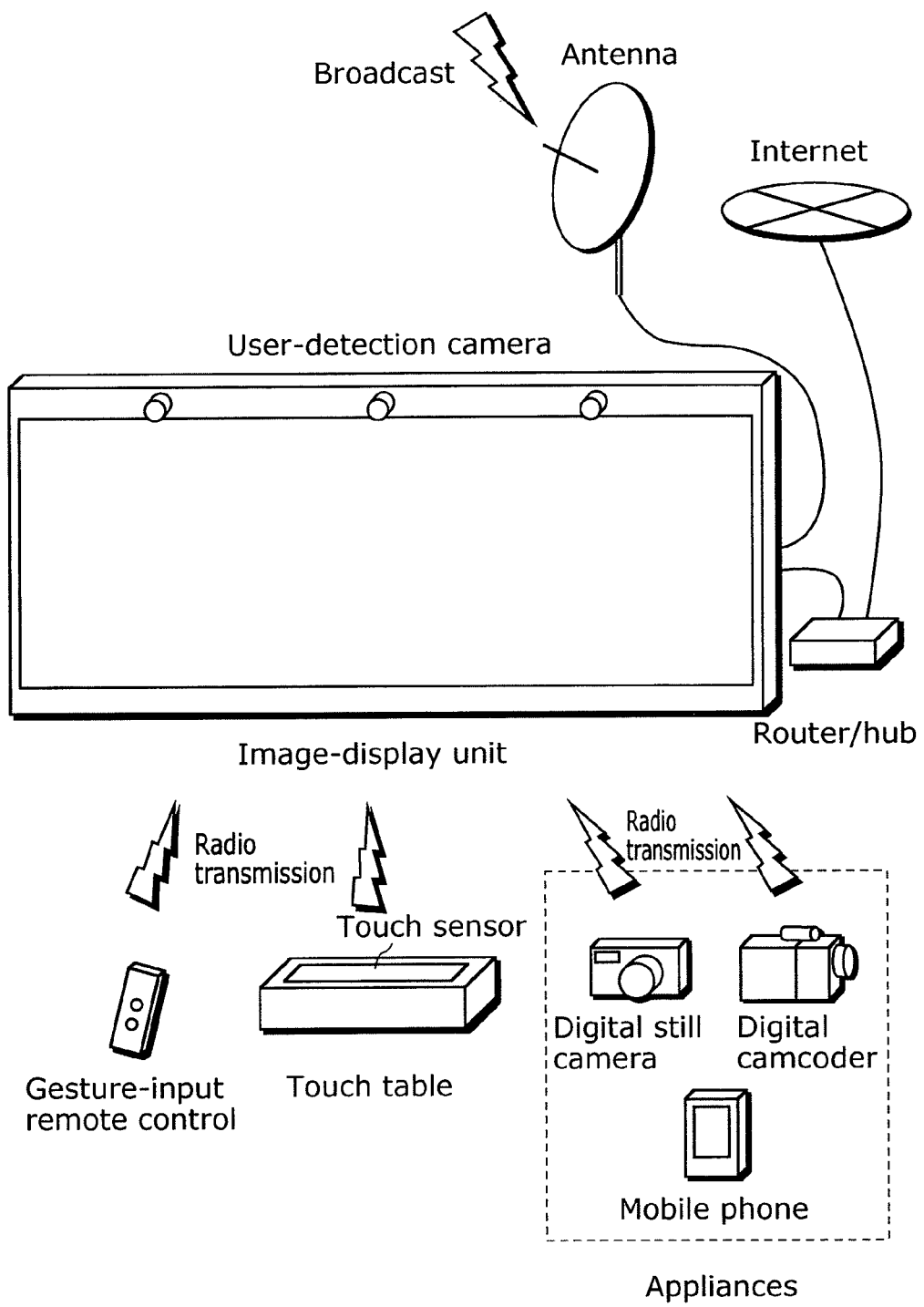
FIG. 1A is a diagram showing an exemplary appearance of a user interface device and an exemplary interface between the user interface device and related apparatuses according to one embodiment of the present invention.

FIG. 1A is a diagram showing an exemplary appearance of a user interface device and an exemplary interface between the user interface device and related apparatuses according to one embodiment of the present invention. The user interface device includes, for example, one or more user detection cameras. Display on the image display unit is controlled according to a position and a movement of a user detected by analyzing image information obtained by the one or more user detection cameras.

The display on the image display unit may be controlled based on a movement of a user's hand holding a gesture-input remote control or a remote control operation of the user such as pressing a button provided on the remote controller.

Moreover, the user interface device may receive an input from a touch table provided with an electrostatic touchpad. Accordingly, the user can further choose various input methods to suit situations of the user or types of applications.

Furthermore, the user interface device may be network-connected to other household electrical appliances such as a digital still camera and a digital camcorder via radio transmission or via a router/hub.

The user interface device may include speakers, not shown in FIG. 1A, which are arranged at the upper end and the lower end, or the right end and the left end of the image display unit.

Figure 1B:
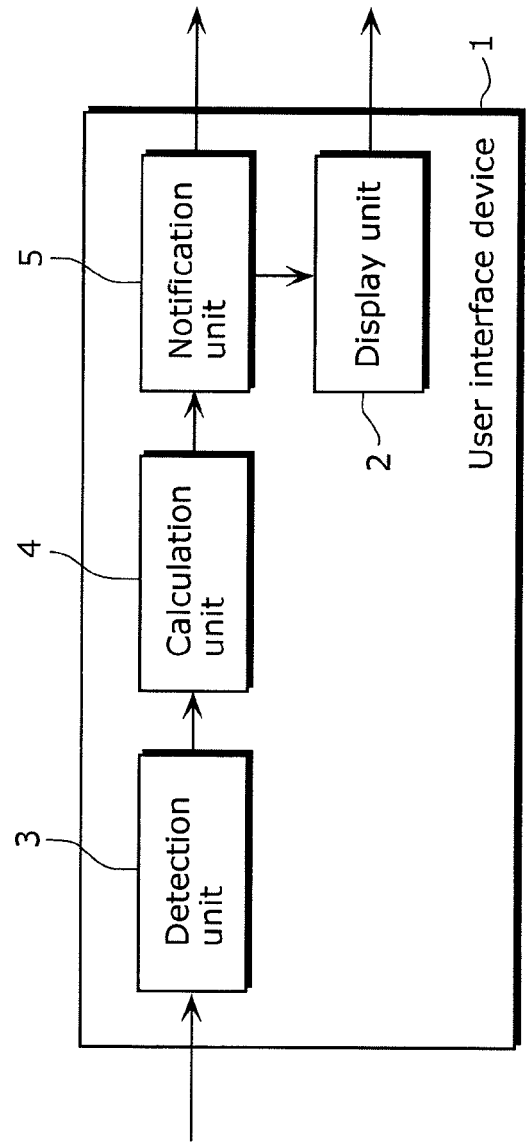
FIG. 1B is a functional block diagram showing a configuration of a user interface device according to the one embodiment of the present invention.

The following describes in detail a configuration of a user interface device 1 according to one embodiment of the present invention with reference to FIG. 1B. FIG. 1B is a block diagram of the user interface device 1.

The user interface device 1 includes a display unit 2, a detection unit 3, a calculation unit 4, and a notification unit 5. The display unit 2 may correspond to the image display unit shown in FIG. 1A, and the detection unit 3 may correspond to the user detection camera shown in FIG. 1A.

The user interface device 1 displays, on the display unit 2, a work space which serves as an interface for controlling an application. The work space is assigned to each user and allows the user to control an application through the work space. A typical use of the interface apparatus 1 may be seen in a situation where a first work space and a second work space neighbor each other on the display unit 2, and a first user and a second user control respective applications through the first work space and the second work space, respectively.

Applications controlled on the work spaces may include, but not be limited to, a drawing application to draw a picture on the display unit 2, a playback application to display an image on the display unit 2, and a menu screen to allow a user to select an application to execute.

Users control (or operate) these applications by making predetermined gestures in front of the display unit 2. For example, a user may have a menu screen displayed by holding the user's palm facing toward the display unit 2 for a predetermined time. For example, when a drawing application is executed, a user may draw a line along a movement of the user's hand on the display unit 2 by moving the hand with a forefinger held up. Furthermore, the playback application may be "Stay-with-Me TV" which causes a window displaying a video to follow a user ("Stay-with-Me TV" is a registered trademark).

The display unit 2 is, for example, a large-size display panel. Any type of available display panel such as a liquid crystal display, a plasma display, and an organic EL display can be used as the display panel. The display unit 2 is segmented into work spaces assigned to respective users.

The display 2 may display a feedback indication which transmits validity of a gesture to a user. The feedback indication is displayed in a position corresponding to a position of the gesture detected by the detection unit 3. For example, the display unit 2 may display a handshape in a position on the display unit 2 corresponding to a position of a user's hand and provide the user with feedback on validity of a gesture by changing the size or shading of the handshape.

The validity of a gesture may refer to whether or not the gesture of the hand conforms to a rule. For the present invention, however, it refers to whether or not the gesture is made in an appropriate position, which is indicated in feedback to a user. More specifically, the following describes a method of preventing the first user from becoming too close the second work space in the case where the first user and the second user are working with applications next to each other.

The detection unit 3 detects positions of the users in front of the display unit 2. Furthermore, the detection unit 3 may identify the users in front of the display unit 2, or detect a gesture or an amount of utterance of each of the users. The detection unit 3 includes, for example, an imaging unit such as a user detection camera and an analysis unit which analyzes an image captured by the imaging unit and detects information such as positions of the users.

The calculation unit 4 calculates an appropriate distance between the first user and the second work space. For example, the appropriate distance is calculated according to the type of an application which the first user is controlling through the first work space. The calculation of the appropriate distance may take into account a physical characteristic of the first user, similarity or relevance between applications which are controlled through the first and the second work spaces, or human relationship between the first user and the second user (subordinate-superior relationship).

The calculation unit 4 calculates the appropriate distance between the first user and the second work space according to the type of an application which the first user is controlling through the first work space. For example, when a menu screen or a playback application is executed, the appropriate distance is calculated based on widths of windows of these applications. The calculation unit 4 may calculate the appropriate distance so that the appropriate distance is shorter when the application program controlled by the user through the first work space and an application program controlled by another user through the second work space are more similar or more relevant.

The calculation unit 4 may calculate an appropriate distance according to physical characteristics of the users. For example, when a drawing application is executed, the appropriate distance may be length of an arm of the first user. Alternatively, the calculation unit 4 may calculate the appropriate distance so that the appropriate distance is longer as a body height of a user is greater or an arm of a user is longer. Alternatively, the calculation unit 4 may calculate the appropriate distance so that the appropriate distance is longer when a hand of a user closer to the second work space is the dominant hand of the user than when a hand of the user farther from the second work space is the dominant hand of the user.

Furthermore, the calculation unit 4 may calculate an appropriate distance based on a relationship between the first user operating in the first work space and the second user operating in the second work space. For example, the calculation unit may calculate an appropriate distance so that the appropriate distance is shorter when the first user is of a higher social status than the second user than when the first user is of a lower social status than the second user. In this case, the calculation unit 4 may presume the relationship between the first user and the second user from amounts of utterances detected by the detection unit 3.

The notification unit 5 notifies a user that the distance between the user, who has been detected by the detection unit 3, and a work space adjacent to a work space assigned to the user is shorter than the appropriate distance. Possible methods of making this notification include, but are not limited to, an indication on the display unit 2, an audible notification, a notification using illumination, a notification through a handheld device carried by the user.

In one embodiment, the notification unit 5 may notify the user that the distance between the user and the work space adjacent to a work space assigned to the user is shorter than the appropriate distance by changing appearance of the feedback indication. For example, the handshape may be made deeper in color (or larger) in the case where the distance is longer than the appropriate distance, and made lighter (or smaller) in the case where the distance is shorter than the appropriate distance.

In another embodiment, in the case where "Stay-with-Me TV" is used, the notification unit 5 may notify the user of the relationship between the user's position and the appropriate distance by changing followability of the window. For example, the followability may be at the maximum in the case where the distance between the user and the next work space is longer than the appropriate distance, and is gradually lowered as the distance shorter than the appropriate distance becomes shorter.

Figure 2A:
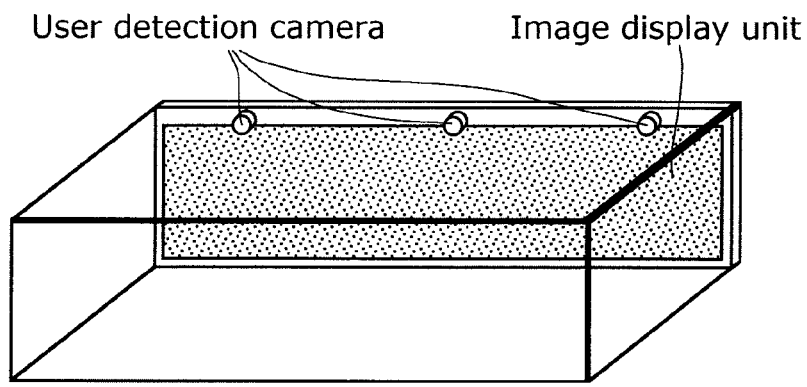
FIG. 2A is a diagram showing an example of installation of the user interface device according to the one embodiment of the present invention.
Figure 2B:
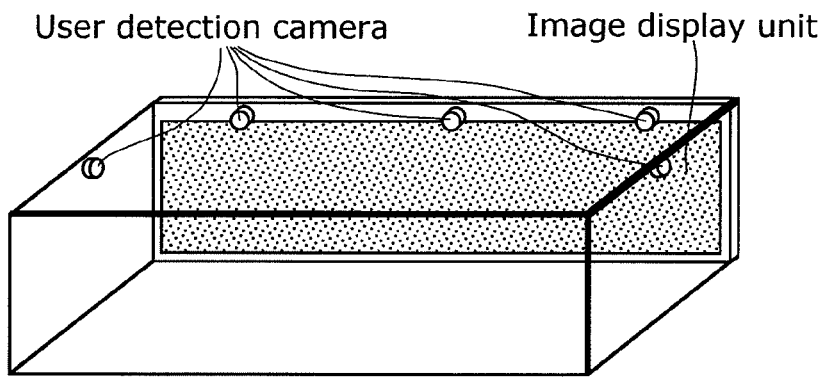
FIG. 2B is a diagram showing another example of installation of the user interface device according to the one embodiment of the present invention.
Figure 2C:
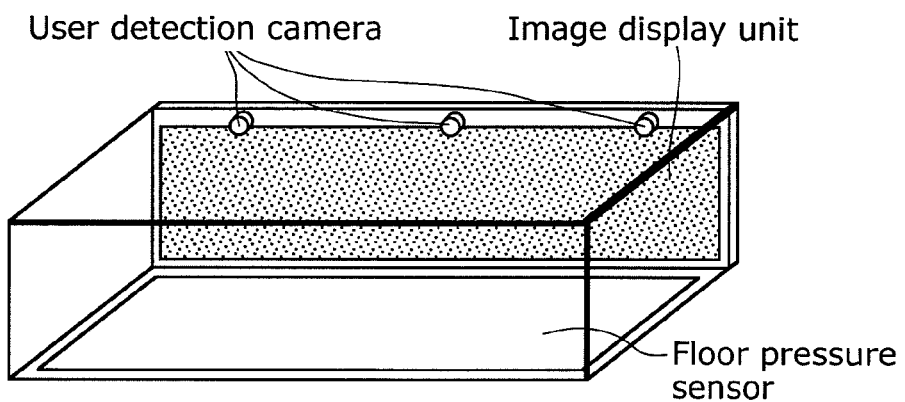
FIG. 2C is a diagram showing still another example of installation of the user interface device according to the one embodiment of the present invention.

FIGS. 2A to 2C are diagrams each showing an example of installation of the user interface device in the present invention. User detection cameras are installed on a frame of the image display unit as shown in FIG. 2A. The installation is not limited to this, and the user detection cameras may be installed on a wall or a ceiling in a space where the image display unit is installed as shown in FIG. 2B. Furthermore, a user detection camera installed on the frame of the image display unit and a user detection camera installed on the wall or the ceiling may be used at the same time. As shown in FIG. 2C, installing a floor pressure sensor on a floor makes it possible to highly accurately detect a position of the user based on an output of the floor pressure sensor, without analyzing an image captured by a user detection camera.

Figure 3:
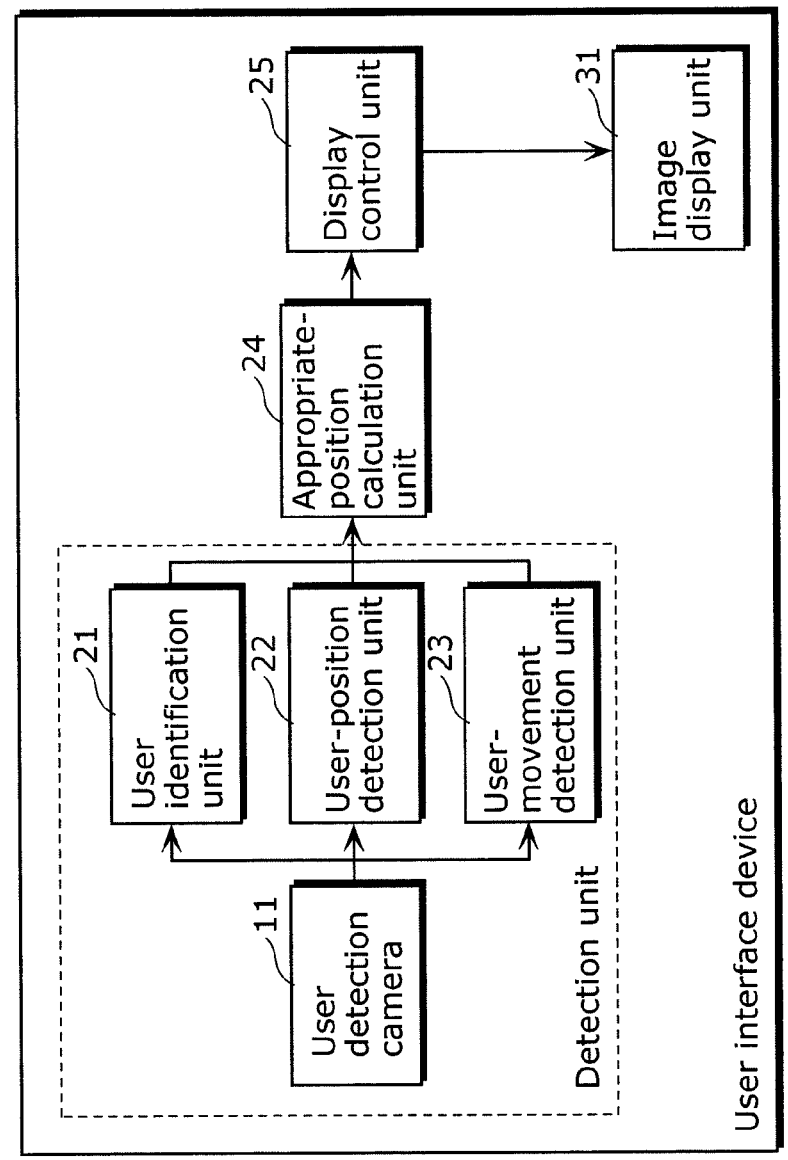
FIG. 3 is a functional block diagram showing a configuration of a user interface device according to the one embodiment of the present invention.

FIG. 3 is a diagram showing a configuration example of a user interface device 10 according to a preferred embodiment of the present invention.

The user interface device 10 includes a user detection camera 11, a user identification unit 21, a user-position detection unit 22, a user-movement detection unit 23, an appropriate-position calculation unit 24, a display control unit 25, and an image display unit 31.

It is to be noted that the user detection camera 11, the user identification unit 21, the user-position detection unit 22, and the user-movement detection unit 23 constitute the detection unit 3 shown in FIG. 1B in the present embodiment. In addition, the appropriate-position calculation unit 24, the transfer object display control unit 25, and the image display unit 31 correspond to the calculation unit 4, the notification unit 5, and the display unit 2 that are shown in FIG. 1B, respectively.

FIGS. 4A to 4D are diagrams showing an overview of data components of a user information database (DB).

Figures 4A, 4B:
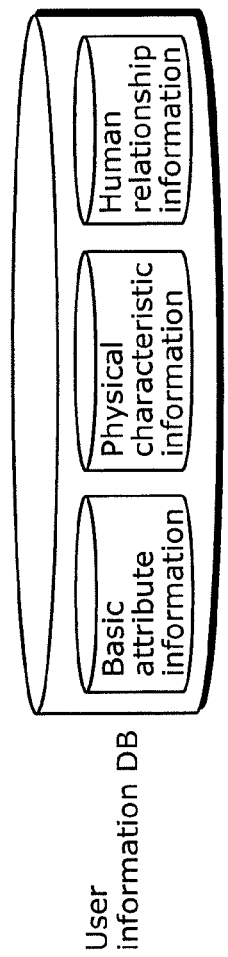
FIG. 4A is a diagram showing a user information database according to the one embodiment of the present invention.
FIG. 4B is a diagram showing an example of basic attribute information included in the user information database.

Although not shown in FIG. 3, the user interface device 10 may preferably include the user information DB which stores, for example, basic attribute information, physical characteristic information, and human relationship information. As shown in FIG. 4B, the basic attribute information includes, for example, name, age, gender, and relationship. The basic attribute information may be referred to, for example, by the user identification unit 21 so as to identify a user in front of the image display unit 31.

As shown in FIG. 4C, the physical characteristic information stored in the user information DB may include body characteristics according to user's postures, visual ability, and auditory ability, such as body height and eye height in a standing posture, body height and eye height in a sitting posture, dominant hand, dominant eye, eye sight, and audibility. The physical characteristic information may be referred to as reference information, for example, by the appropriate-position calculation unit 24 so as to calculate an appropriate position.

As shown in FIG. 4D, for example, the human relationship information stored in the user information DB includes friendship between users registered in the database using indices of 0.0 to 1.0. The human relationship information may be referred to as reference information, for example, by the appropriate-position calculation unit 24 so as to calculate an appropriate position. Specifically, the friendship can be used for specifying a subordinate-superior relationship between work spaces or windows on the screen corresponding to respective users or for controlling feedback.

The user detection camera 11 is an image sensor such as a charge-coupled device (CCD) or a complementary metal oxide semiconductor (CMOS) installed on a frame of the image display unit 31. The user detection camera 11 captures an image of the user in front of the image display unit 31.

2.1. User Identification Unit

The user identification unit 21, for example, extracts a face region from an image captured by the user detection camera 11, and then outputs user identification information for identifying a user, by checking the extracted face image with pre-registered face images.

2.2. User-Position Detection Unit

The user-position detection unit 22 extracts user regions from images captured by the user detection camera 11, and then calculates a relative position of the user with respect to the image display unit 31 from a correspondence relationship between the user regions in the images according to a principle of stereoscopy.

Figure 5A:
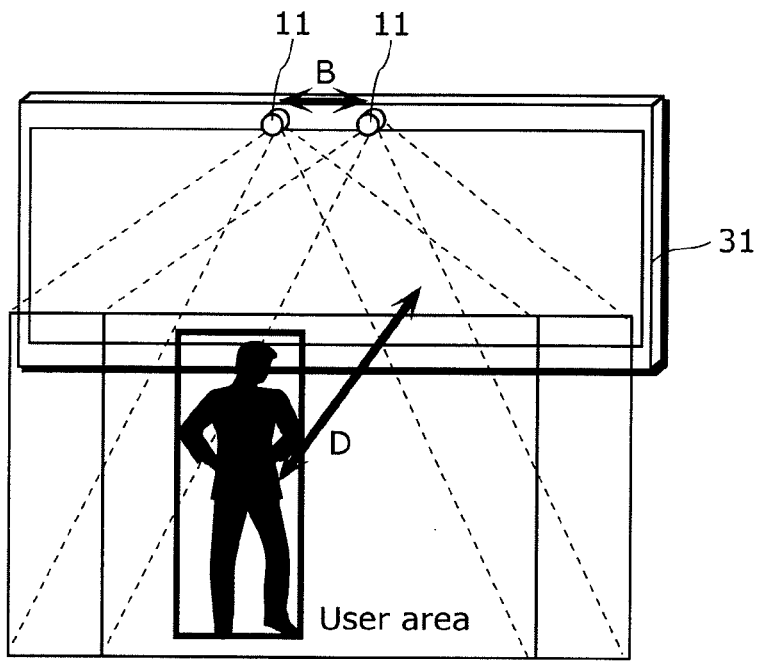
FIG. 5A is a diagram showing an overview of a method of detecting a user position according to the one embodiment of the present invention.
Figure 5B:
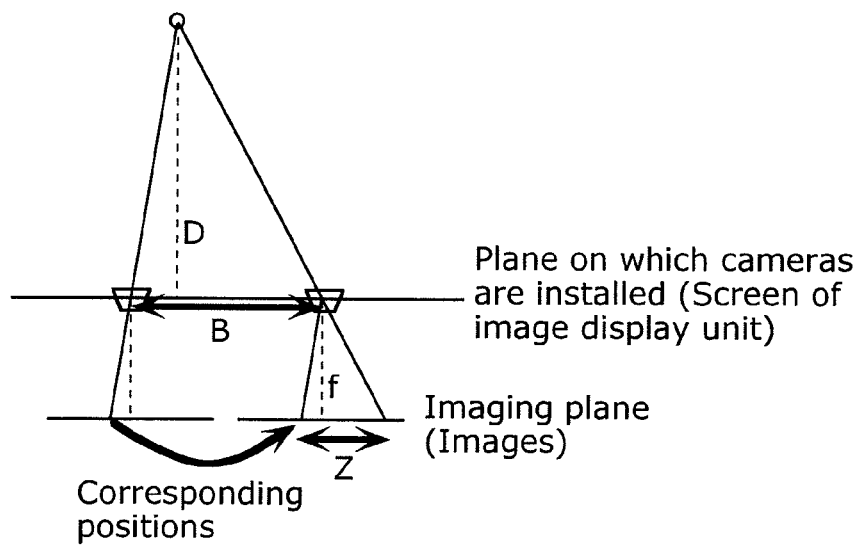
FIG. 5B is a diagram showing a principle of stereoscopy that is used in an exemplary method of detecting the user position.

FIGS. 5A and 5B are diagrams showing a user-position calculation method based on the principle of stereoscopy performed by the user-position detection unit 22 according to the one embodiment of the present invention.

As shown in FIG. 5A, two paired user detection cameras 11 are installed in parallel to a screen of the image display unit 31 with an interval B therebetween. The user-position detection unit 22 calculates a distance D between the user and the screen of the image display unit 31 based on a positional difference between corresponding user regions in images each captured by a corresponding one of the user detection cameras 11.

Extraction of the user regions in the images each captured by the corresponding one of the user detection cameras 11 can be achieved by, for example, storing in advance an image captured by each of the user detection cameras 11 when no user is present in front of the image display unit 31 and determining differences between the stored images and images captured when a user is present in front of the image display unit 31. Alternatively, a user region may be a face region which is determined by detecting a face image of the user and checking the face image with pre-registered face images.

FIG. 5B shows the principle of stereoscopy for determining the distance D between a user and a plane on which the user detection cameras 11 are installed (or the screen of the image display unit 31), based on user regions corresponding to each other between two images. Here, the user regions corresponding to each other between the images captured by the two user detection cameras 11 are considered as an object of position measurement. The user regions are projected onto two images as shown in FIG. 5B. When a distance between the corresponding objects in the images is Z, the distance D between the user and the image display unit 31 can be determined by the equation, $D=f \times B/Z$, where f is a focal length of one of the user detection cameras 11, and B is a distance between optical axes of the user detection cameras 11. In addition, a user position in a direction parallel to the screen of the image display unit 31 can be determined based on positions of the user regions in the images and the above distance D. The user-position detection unit 22 outputs thus obtained relative position of the user with respect to the image display unit 31.

By using user position information thus obtained for, for example, determining a position of information to be presented to the user on the screen of the image display unit 31, it is made possible to constantly present a work space, a window, or information to the user in such positions that it is easy for the user to view even when the user moves. This may be referred to as "Stay-with-Me TV", which follows a user.

Figure 6A:
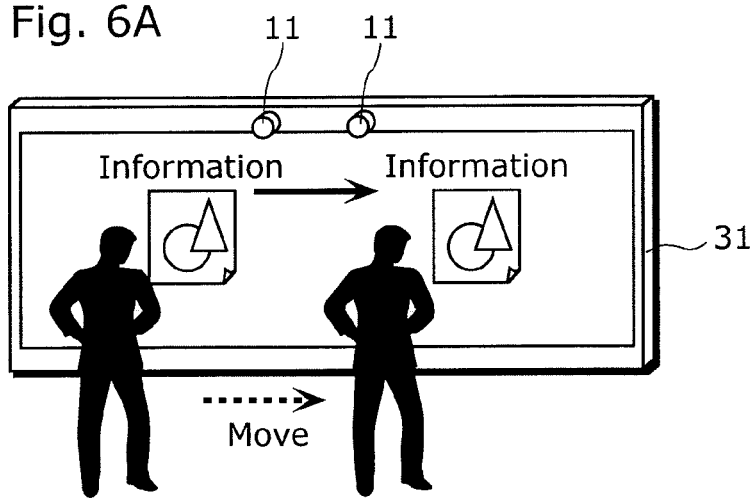
FIG. 6A is a diagram showing an example of operation of the user interface device according to the one embodiment of the present invention in the cases where the user moves in parallel to a display unit.
Figure 6B:
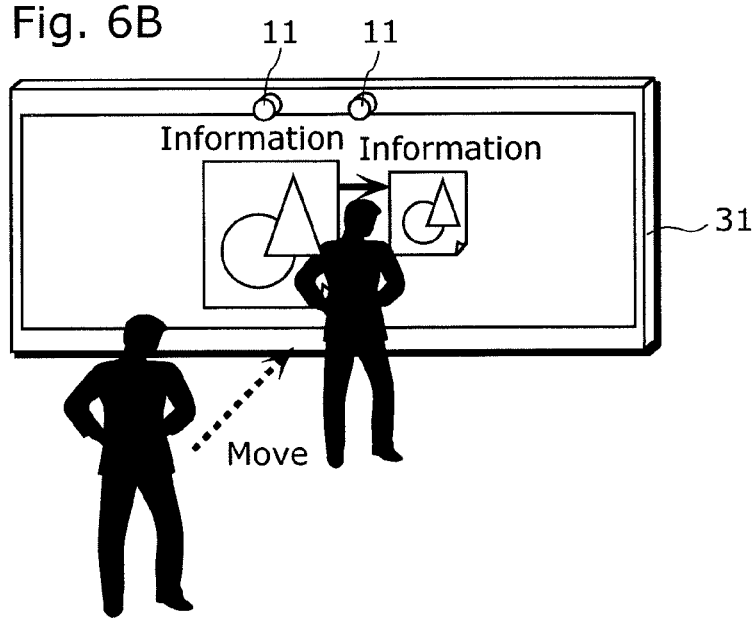
FIG. 6B is a diagram showing an example of operation of the user interface device according to the one embodiment of the present invention in the cases where there is a change in a distance between the user and the display unit.
Figure 6C:
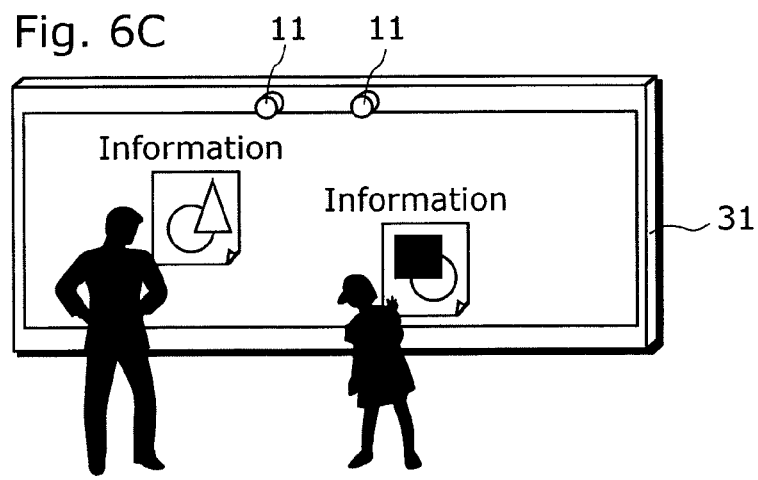
FIG. 6C is a diagram showing an example of operation of the user interface device according to the one embodiment of the present invention, where the user interface device operates according to a physical characteristic of the user.

For example, when a user in front of the image display unit 31 moves along the screen, information is displayed in positions close to positions of the user on the screen as shown in FIG. 6A. When a user moves toward or away from the image display unit 31, the display size of information is decreased or increased as shown in FIG. 6B so that the information is presented in sizes convenient for the user. Furthermore, information can be presented at a height convenient to each user according to the height of the face of the user as shown in FIG. 6C.

It is to be noted that a distance image sensor which outputs distance information according to a principle of electro-optical distance measurement (time of flight) may be used as the user detection cameras 11. Including the distance image sensor in the user interface device 10 makes it easier for the user-position detection unit 22 to calculate the relative position of the user with respect to the image display unit 31.

Furthermore, in the case where a floor pressure sensor is installed in the space as shown in FIG. 2C, the user-position detection unit 22 can calculate, using an output value of the floor pressure sensor as an input, the relative position of the user with respect to the image display unit 31, without using the information provided by the user detection cameras 11.

2.3. User-Movement Detection Unit

The user-movement detection unit 23 extracts a hand region of the user, checks a position and a gesture of the hand match with pre-defined shapes, and then outputs hand-gesture information such as "clenched", "opened", "selecting right", and "selecting left".

Figure 7A:
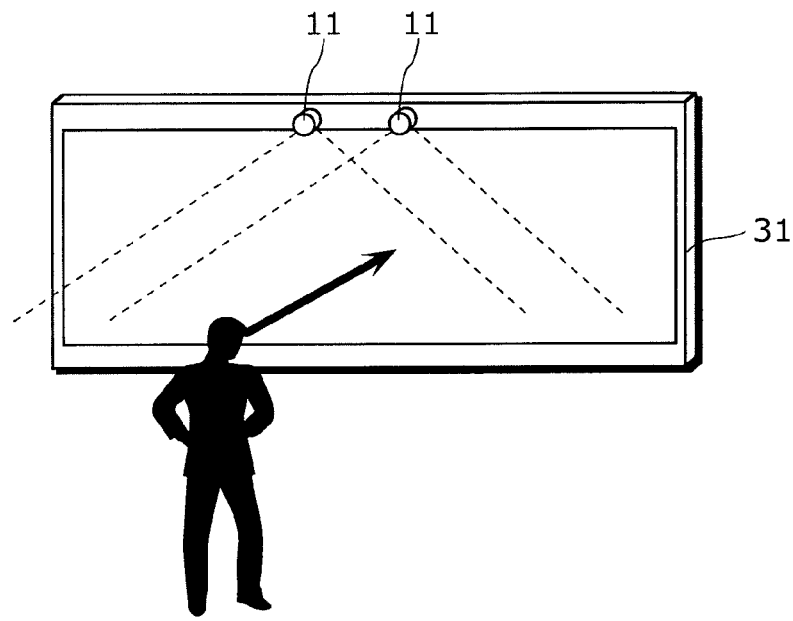
FIG. 7A is a diagram showing an overview of a method of detecting a freehand gesture according to the one embodiment of the present invention.
Figure 7B:
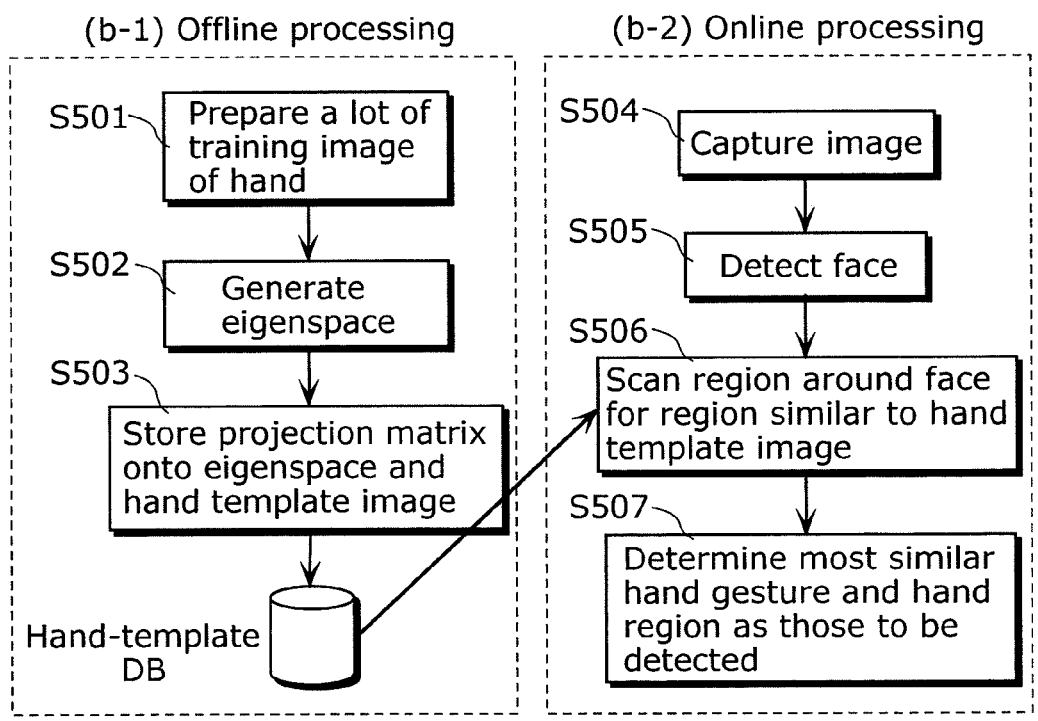
FIG. 7B is a diagram showing a procedure of processing of detecting a freehand gesture according to the one embodiment of the present invention.

FIGS. 7A and 7B show a method of detecting a position and a gesture of a hand which is performed by the user-movement detection unit 23 according to the one embodiment of the present invention.

As shown in FIG. 7A, the user-movement detection unit 23 first detects a position of a person from an image captured by the user detection cameras 11, and then detects a position and a gesture of a hand of the person around the position of the person. Estimating a position and a gesture of a hand is made possible by, for example, using the following method. The following describes such a method with reference to FIG. 7B.

First, in offline processing, the user-movement detection unit 23 prepares a lot of training images of a hand to be detected (S501). It is desirable that conditions such as a lighting environment and orientation of the hand in the training images are consistent with conditions preferably in conformance to an environment where the hand is actually detected. Next, an eigenspace which indicates principal components of the hand is generated from the training images prepared in S501 using a principal component analysis (S502). In addition, a template image is prepared as a sample of a hand to be detected. The template image may be an average image of the provided training images of the hand. Alternatively, two or more template images, such as an image of a clenched hand and an image of an opened hand, may be prepared. A projection matrix onto the generated eigenspace and the template image of the hand are stored in a hand-template database (S503).

The following describes online processing in which a hand is actually detected.

The user detection cameras 11 capture images of the user in front of the image display unit 31 (S504). The user-movement detection unit 23 then detects a face region from the images captured by the user detection cameras 11 (S505).

When a face region is detected in S505, the user-movement detection unit 23 performs detection of a hand around the face region. Specifically, the user-movement detection unit 23 scans a region around the face region for a region similar to the prepared template image of a hand using the template image of a hand stored in the hand-template database (S506). The region around the face region may be a region which is based on the position of the face and has a predetermined size. Alternatively, the region to be scanned may be reduced in size according to the principle of stereoscopy using two user detection cameras 11, so that a region around the face region and close to the face in depth is scanned.

In calculation of similarity for the purpose of matching, first, clipped images of candidate hand regions and the template image of the hand are projected onto the eigenspace using the projection matrix onto the eigenspace. Then, distances between the clipped images and the template image in the eigenspace are compared. This comparison of the distances in the space which indicates principal components of the hand allows detection with less influence of noises such as a background. A region which is within the region to be scanned, satisfies a predetermined threshold, and is at the shortest distance from the template image of a hand is specified as a position of a hand. In addition, the hand is determined to have a gesture, such as "clenched" or "opened", indicated in the template image at the shortest distance from the clipped image (S507).

In the case where no region is detected which satisfies the threshold, the detection is terminated with a result that no hand is present.

Although a method of template matching is used for detecting the position and the gesture of the hand in the example above, other methods such as boosting may be used instead.

The application applied to the user interface device 10 according to the present invention includes options which are preliminarily associated with positions and gestures of the user's hand. Accordingly, selection of one of the options is determined depending on a position and a gesture of the user's hand detected by the user-movement detection unit 23.

2.4. Appropriate-Position Calculation Unit

An appropriate-position calculation unit 24 specifies an appropriate position of a user by calculating an appropriate distance between the user and a work space or another user around the user using input information such as user-identification information provided from the user identification unit 21, user position information provided from the user-position detection unit 22, and information on a position and a gesture of a hand provided from the user-gesture detection unit 23.

2.5. Display Control Unit

The display control unit 25 controls, based on the appropriate position of the user specified by the appropriate-position calculation unit 24, an application displayed on the image display unit 31. A method of controlling an application is specifically described in "3. Operation" below.

3. Operation

Figure 8:
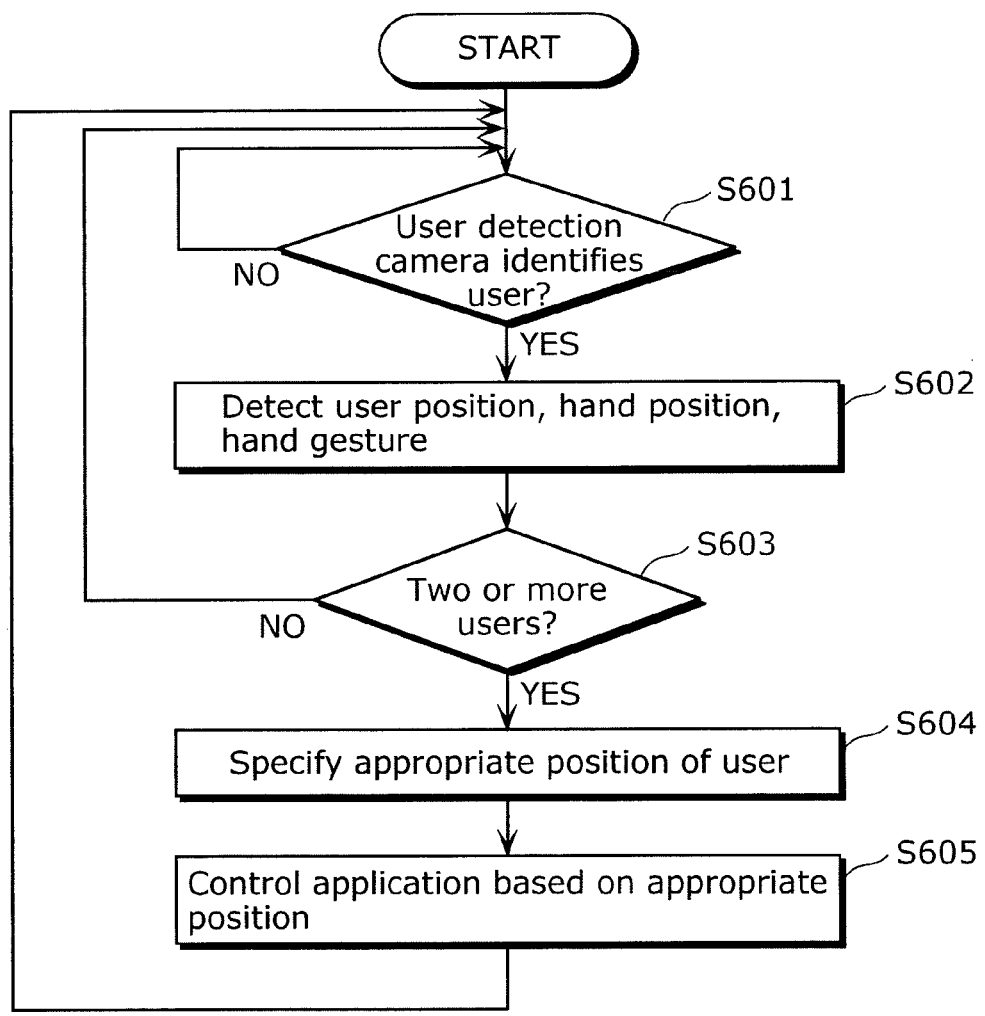
FIG. 8 is a flowchart showing an overview of processing performed by the user interface device according to the one embodiment of the present invention.

FIG. 8 is a flowchart showing an overview of processing performed by the user interface device 10 according to the one embodiment of the present invention.

First, the user identification unit 21 detects a user's face from an image captured by the user detection camera 11. Next, the user identification unit 21 identifies the user by matching the detected face with the physical characteristic information stored in the preliminarily registered user information DB (S601). Then, for the identified user, the user-position detection unit 22 calculates user position information, and the user-gesture detection unit 23 calculates information on a position and a gesture of a hand (S602).

In the case where two or more users operating the user interface device 10 are identified (YES in S603), the appropriate-position calculation unit 24 calculates appropriate positions of the users (S604). The display control unit 25 controls, based on the appropriate positions of the users calculated by the appropriate-position calculation unit 24, applications displayed on the image display unit 31 (S605).

The following describes operation of the user interface device 10 using three cases with reference to FIG. 9 to FIG. 14C. The three cases are as follows: Case 1, menu screen operation by gesture input (FIG. 9 to FIG. 11C); Case 2, using a drawing application by gesture input (FIG. 12A and FIG. 12B); and Case 3, using "Stay-with-Me TV" by user position input (FIG. 13A to FIG. 14C).

FIG. 9 shows an example of feedback provided by the user interface device 10 for a gesture of a user's hand. In this example, the display control unit 25 changes appearance of a handshape on the screen (the handshape is hereinafter referred to as a feedback indication) according to deviation of a user's hand from an appropriate position so as to provide the user with feedback to notify the user of the deviation.

The handshape feedback indication may be made lighter in color as the hand is farther from the appropriate position as shown in the top of FIG. 9. The handshape feedback indication may be made smaller as the hand is farther from the appropriate position as shown in the middle of FIG. 9. The handshape feedback indication may be vibrated more as the hand is farther from the appropriate position as shown in the bottom of FIG. 9.

The example shown in FIG. 9 assumes that there is a work space assigned to another user to the right of the appropriate position. In this example, movement to the left of the appropriate position, that is, movement away from the adjacent work space, is considered to be no deviation from the appropriate position and causes no modification of the feedback indication. On the other hand, movement to the right of the appropriate position, that is, movement toward the adjacent work space causes modification of the feedback indication according to the movement. Modification of the feedback indication is not limited to this example, but the feedback indication may be made larger (or deeper in color) as the hand moves to the left of the appropriate position.

(Case 1: Menu Screen Operation by Gesture Input)

FIG. 10A to FIG. 11C show exemplary operation of the user interface device 10 in Case 1. The following describes processing of notifying a user A that the user A is too close to a work space of a user B in the case where the user A and the user B are each controlling an application through a work space assigned to each of the user A and the user B. Processing of notification to the user B is the same as that of the user A; thus a description thereof is omitted.

Figure 10A:
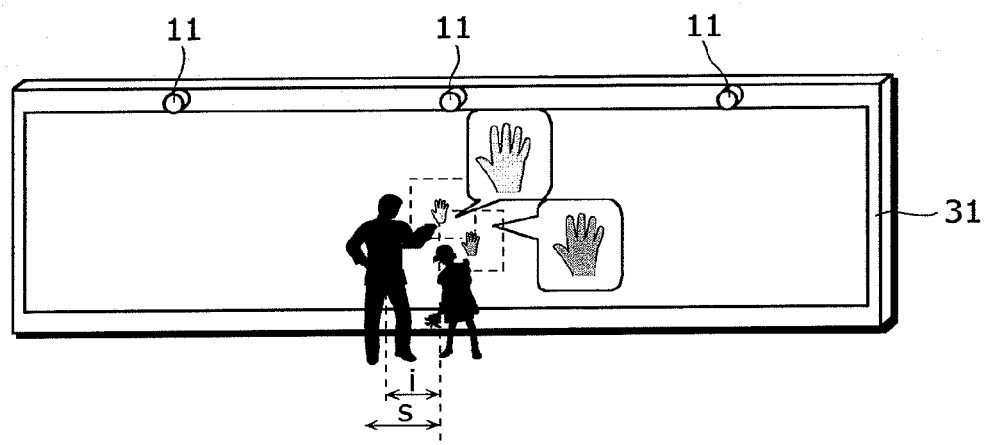
FIG. 10A is a diagram showing an example of operation of the user interface device according to the one embodiment of the present invention.
Figure 10B:
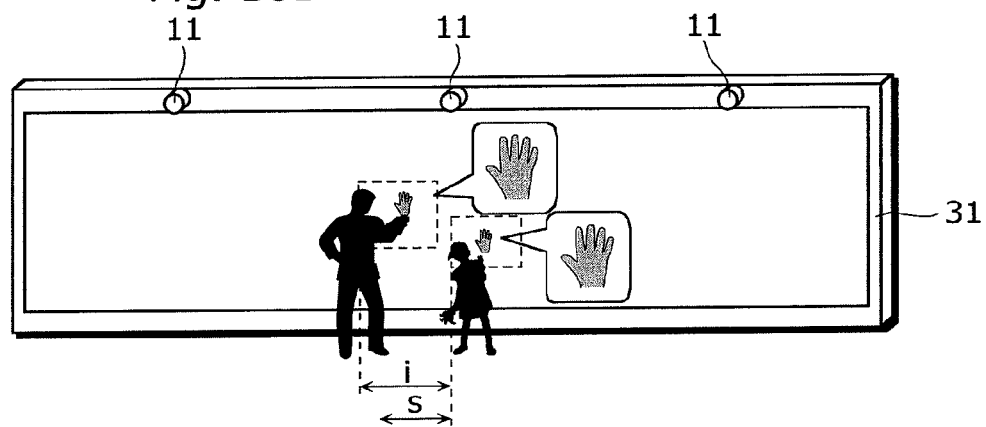
FIG. 10B is a diagram showing the example of operation of the user interface device according to the one embodiment of the present invention.

In Case 1, the image display unit 31 includes two work spaces, which are regions indicated by frames of dashed lines in FIG. 10A and FIG. 10B. One work space is assigned to the user A, and the other work space to the user B. In Case 1, the user A and the user B are each having a menu screen displayed in their work space by making a gesture of facing their palm toward (or holding their hand over) the screen for a predetermined time.

Figure 10C:
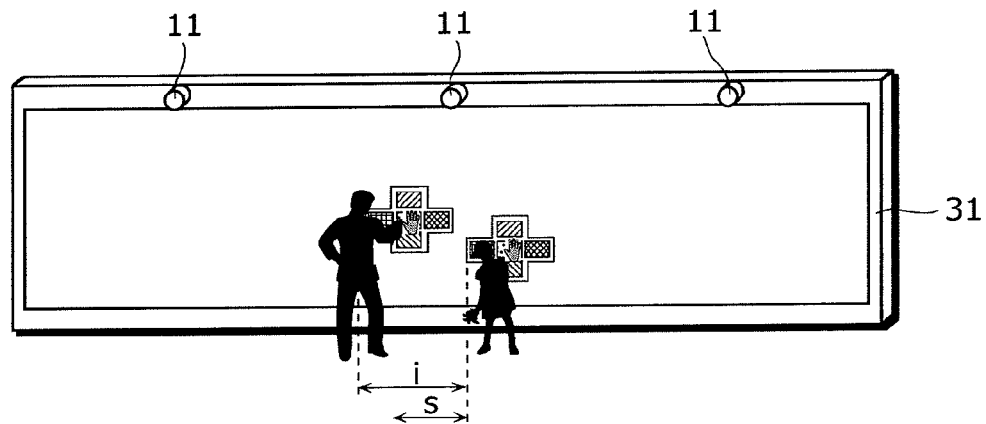
FIG. 10C is a diagram showing the example of operation of the user interface device according to the one embodiment of the present invention.

FIG. 10A to FIG. 10C each show an example where the user A and the user B each have their own menu screen displayed together with a feedback indication by making a gesture of facing their palm toward (or holding their hand over) the screen for a predetermined time.

Figure 11A:
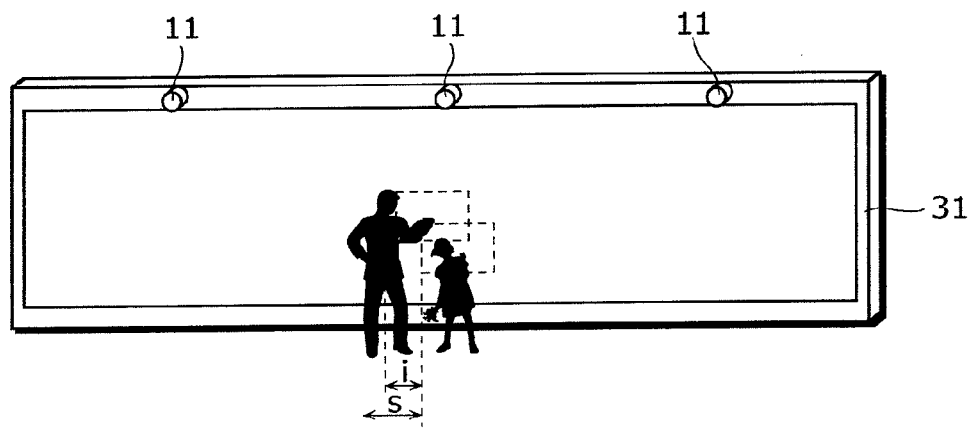
FIG. 11A is a diagram showing another example of operation of the user interface device according to the one embodiment of the present invention.
Figure 11B:
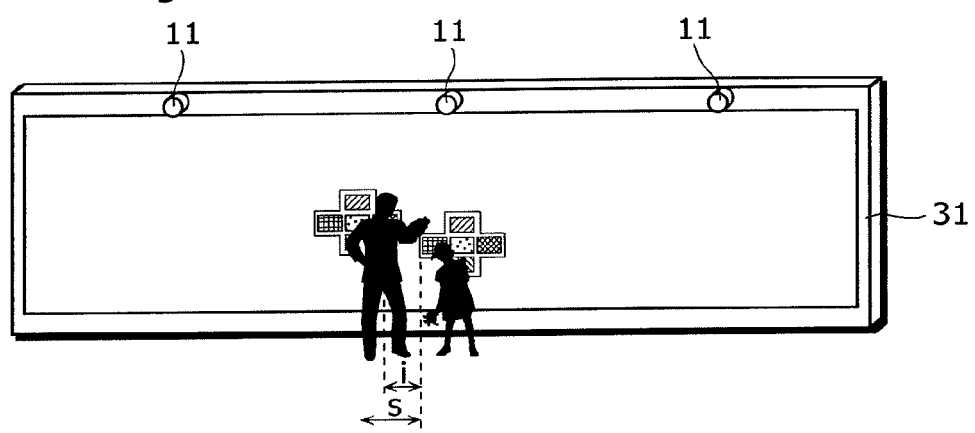
FIG. 11B is a diagram showing the example of operation of the user interface device according to the one embodiment of the present invention.
Figure 11C:
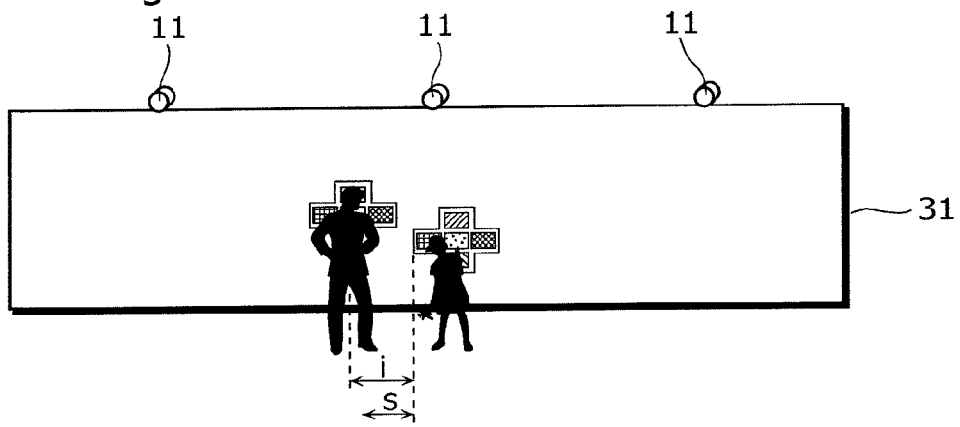
FIG. 11C is a diagram showing the example of operation of the user interface device according to the one embodiment of the present invention.

FIG. 10A to FIG. 10C each show an example where the user A and the user B each have their own feedback indication displayed by making a gesture of facing their palm toward (or holding their hand over) the screen, and then have their own menu screen displayed by keeping their hand as it is for a predetermined time. FIG. 11A to FIG. 11C each show an example where the user A and the user B each have their own menu screen displayed without a feedback indication by making a gesture of facing their palm toward (or holding their hand over) the screen for a predetermined time.

First, the appropriate-position calculation unit 24 sets an appropriate distance s of the user A to a half of a width of the menu screen of the user A (a/2). Setting the appropriate distance s in this way prevents the menu screen of the user A and the menu screen of the user B from overlapping in control of the applications. The appropriate distance s may further include a margin.

The user-position detection unit 22 calculates an actual distance i between the user A and the work space assigned to the user B based on the image captured by the user detection camera 11. The distance i is a distance between the center of gravity of the user A and the left edge of the work space assigned to the user B.

In FIG. 10A, the distance calculated by the user-position detection unit 22 is shorter than the appropriate distance s. In this case, the display control unit 25 makes the handshape feedback indication of the user A lighter in color so as to notify the user A that the user A is so close to an adjacent work space as to be beyond a position which is at the appropriate distance s from the adjacent work space. Although the user B is provided with a normal feedback indication, the user B may be also provided with a feedback indication lighter than the normal one.

Seeing the feedback indication, the user A may move away to be distant from the work space assigned to the user B by the appropriate distance as shown in FIG. 10B. Then, the user A is distant from the work space assigned to the user B by the appropriate distance or farther, and the user A and the user B each have their own menu screen displayed as shown in FIG. 10C. The menu screens of the user A and the user B are displayed with no overlap therebetween.

The feedback indication of the hand is made lighter as the feedback indication goes farther from an appropriate position (or toward the work space of the user B) which is a position distant from the left edge of the work space assigned to the user B by the appropriate distance s. The feedback indication may be made smaller or vibrated instead of lighter in color. It is also possible that these changes of appearance are made in combination.

In FIG. 11A, as in FIG. 10A, the actual distance i between the user A and the work space assigned to the user B is shorter than the appropriate distance s, and the user A and the user B are each having a menu screen displayed in their work space by making a gesture of facing their palm toward (or holding their hand over) the screen. In FIG. 11B, the menu screen of the user A is displayed so as to be positioned around a point distant from the left edge of the work space assigned to the user B by the appropriate distance s.

In other words, the user A has the menu screen slightly shifted off to the left of the center of the body of the user A. Then, the user A notices that the user A is too close to the work space assigned to the user B, so that user A will move to the left to be right in front of the menu screen as shown in FIG. 11C. In this case, again, the menu screens of the user A and the user B are displayed with no overlap therebetween.

(Case 2: Using a Drawing Application by Gesture Input)

Figure 12A:
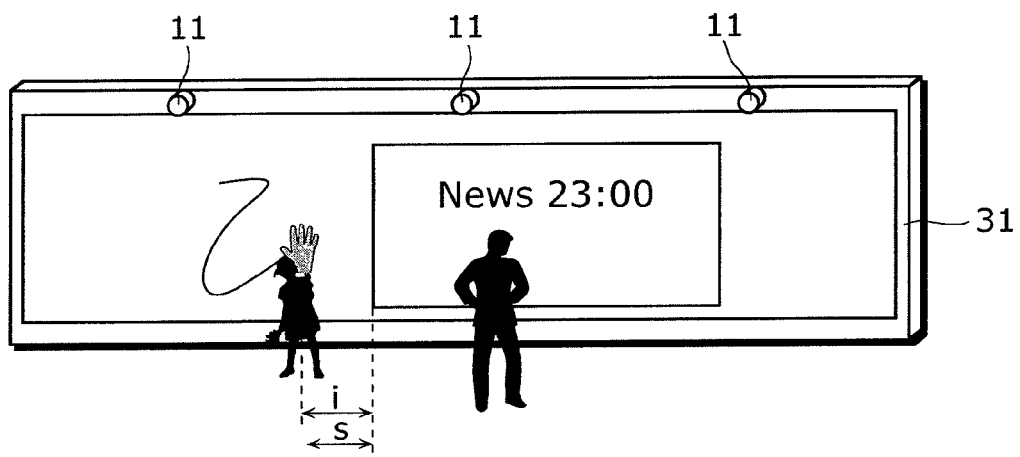
FIG. 12A is a diagram showing still another example of operation of the user interface device according to the one embodiment of the present invention.
Figure 12B:
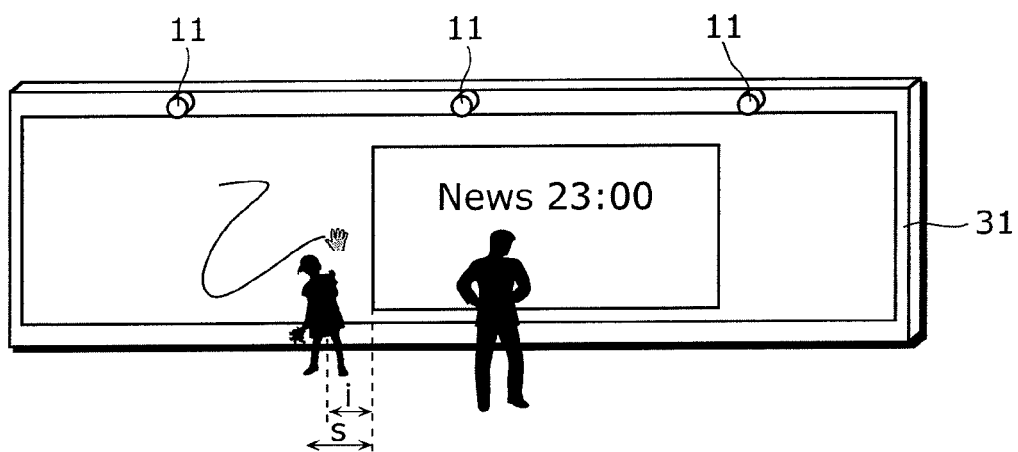
FIG. 12B is a diagram showing the example of operation of the user interface device according to the one embodiment of the present invention.

FIG. 12A to FIG. 12B show exemplary operation of the user interface device 10 in Case 2. The following describes processing of notifying a user A that the user A is too close to a work space of a user B in the case where the user A and the user B are each controlling an application through a work space assigned to each of the user A and the user B. Processing of notification to the user B is the same as that of the user A; thus a description thereof is omitted.

In Case 2, the user A is using a drawing application which draws an object on the display unit 2 according to movement of a hand, and the user B is watching a broadcast program (a news show) adjacent to the user A.

The distance i is a distance from the center of gravity of the user A and the left edge of the work space (a display area of the program being watched) assigned to the user B. In this case, the appropriate distance s is preferably set to the length of an arm of the user A because the drawing application is an application which allows the user A to draw objects on the screen according to movement of a hand of the user A. A margin to be included in the appropriate distance s may be larger when the user A and the user B are using different types of applications than when they are using use the same type of applications.

In FIG. 12A, the display control unit 25 presents a handshape feedback indication in a normal appearance because the distance i from the left end of the display area of the program being watched by the user B to the center of gravity of the user A is longer than the appropriate distance s. In FIG. 12B, the display control unit 25 presents a handshape feedback indication made smaller according to a difference between the distance i and the appropriate distance s because the distance i is shorter than the appropriate distance s. Such a change in the feedback indication allows the user A to know that the user A is too close to the work space of the user B so as to prevent the user A from carelessly entering the work space of the user B.

(Case 3: Using "Stay-with-Me Tv" by User Position Input)

FIG. 13A to FIG. 14C show exemplary operation of the user interface device 10 in Case 3. The following describes processing of notifying a user A that the user A is too close to a work space of a user B in the case where the user A and the user B are each controlling an application through a work space assigned to each of the user A and the user B.

Figure 13A:
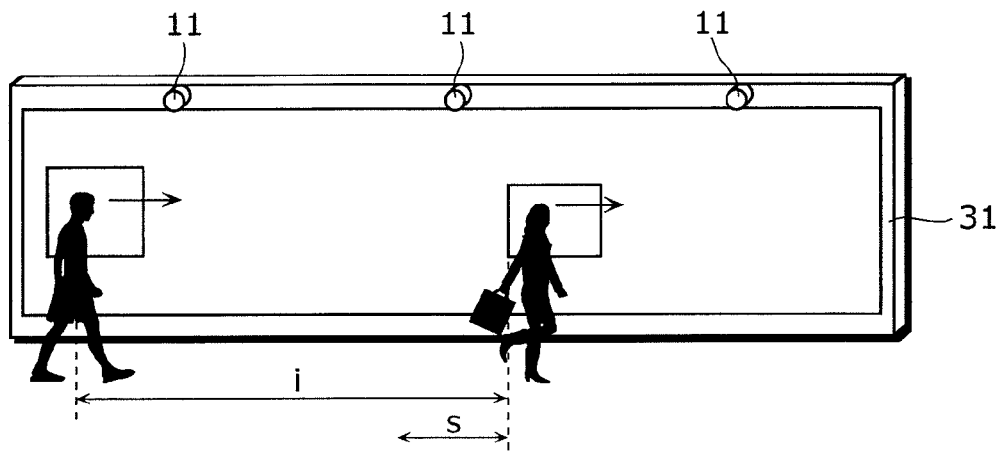
FIG. 13A is a diagram showing still another example of operation of the user interface device according to the one embodiment of the present invention.
Figure 13B:
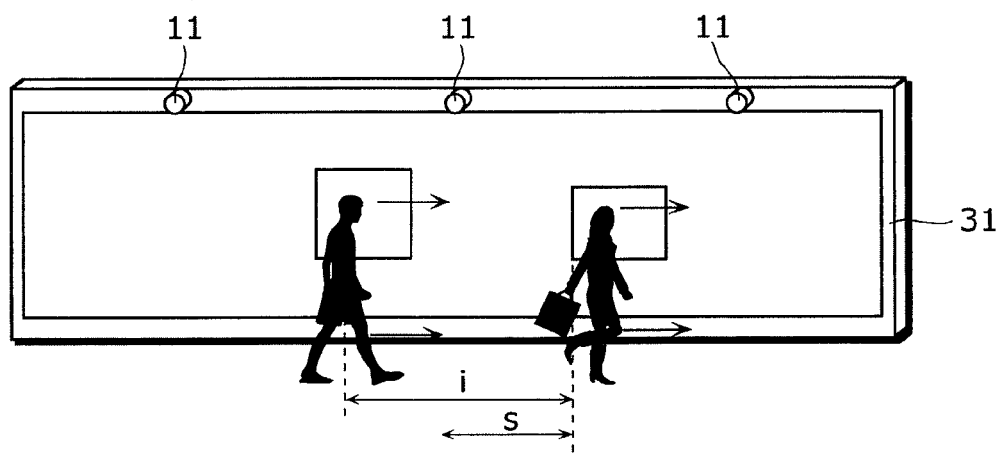
FIG. 13B is a diagram showing the example of operation of the user interface device according to the one embodiment of the present invention.
Figure 13C:
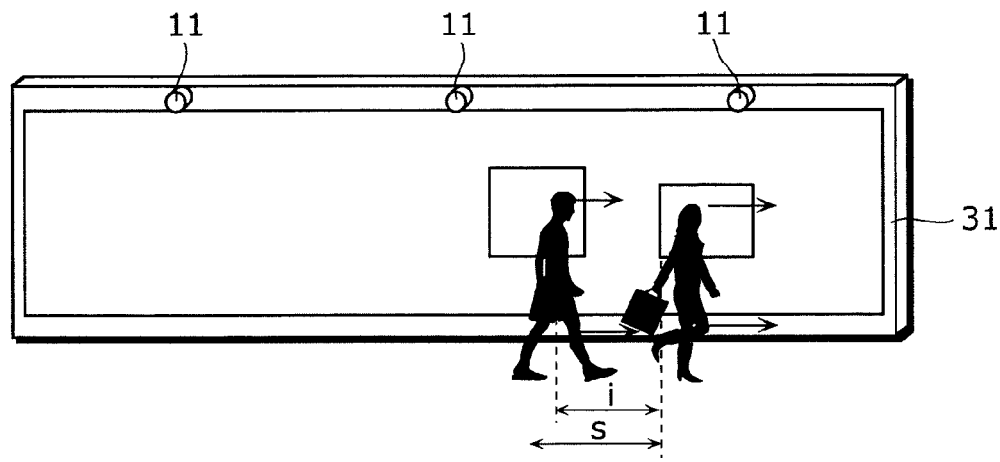
FIG. 13C is a diagram showing the example of operation of the user interface device according to the one embodiment of the present invention.
Figure 14A:
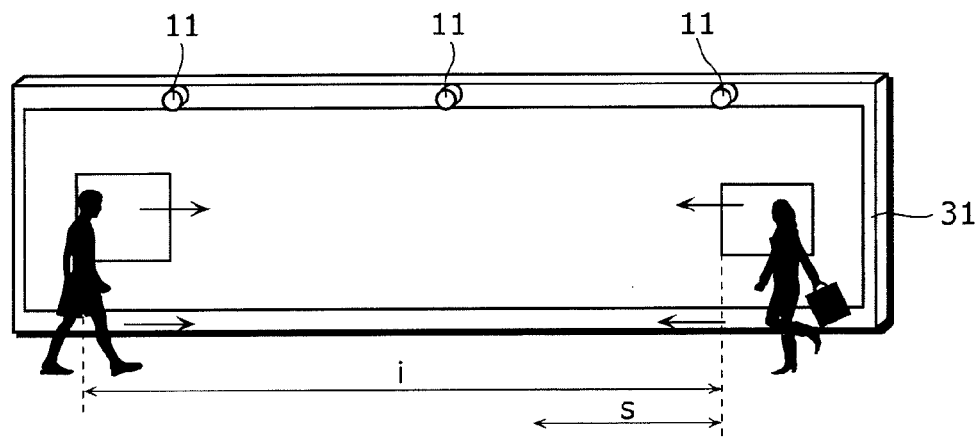
FIG. 14A is a diagram showing still another example of operation of the user interface device according to the one embodiment of the present invention.
Figure 14B:
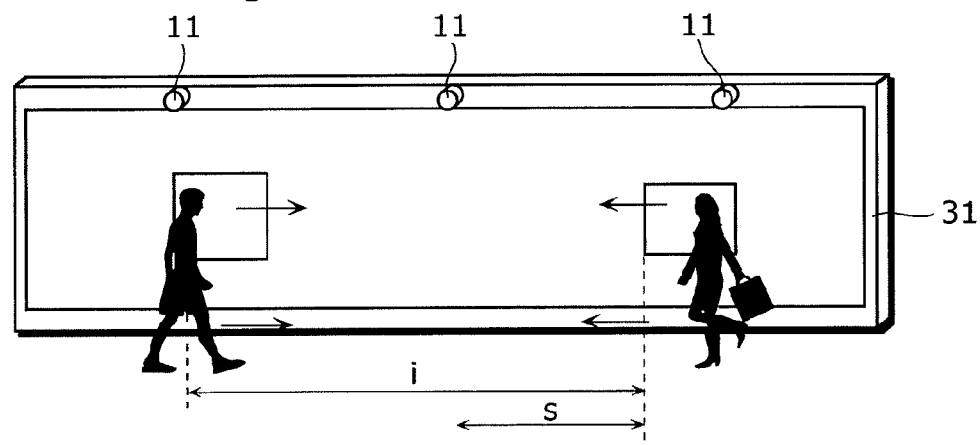
FIG. 14B is a diagram showing the example of operation of the user interface device according to the one embodiment of the present invention.
Figure 14C:
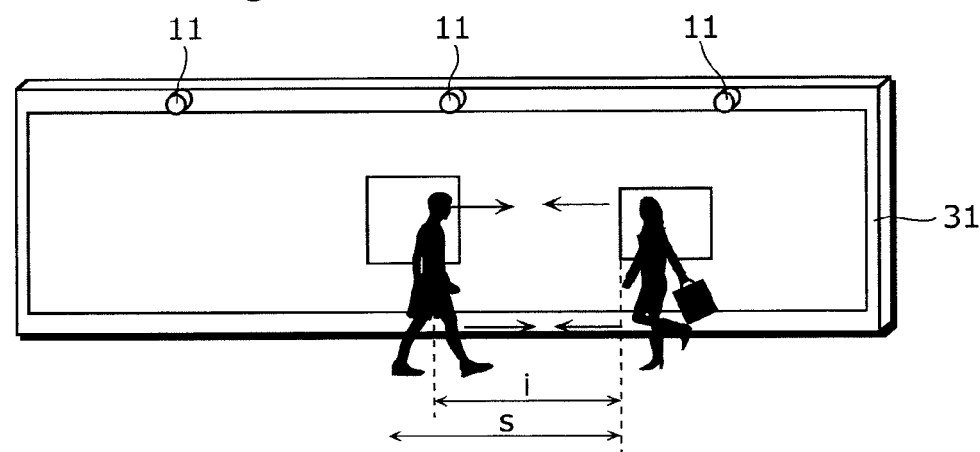
FIG. 14C is a diagram showing the example of operation of the user interface device according to the one embodiment of the present invention.

In Case 3, the user A and the user B use a function referred to as "Stay-with-Me TV" which causes a work space or a window of each user follows movement of the user. FIG. 13A to FIG. 13C show a case where the user A and the user B are moving in the same direction. FIG. 14A to FIG. 14C show a case where the user A and the user B are moving in opposite directions facing each other.

In the case shown in FIG. 13A to FIG. 13C, the appropriate-position calculation unit 24 calculates an appropriate distance s by adding a predetermined margin to the width (a) of the window of the user A.

In FIG. 13A and FIG. 13B, the window of the user A follows movement of the user A with normal followability because the distance i between the user A and the work space assigned to the user B is longer than the appropriate distance s. In FIG. 13C, on the other hand, the distance i between the user A and the work space assigned to the user B is shorter than the appropriate distance s; thus the user A is coming closer to the work space of the user B beyond an appropriate position of the user A. Then, the display control unit 25 notifies the user A that the user A is beyond the appropriate position by lowering the followability of the window of the user A. The user A learns the situation by noticing that the window right beside the user A gradually goes behind. A user may slow down when the user notices that the window right beside the user A gradually goes behind.

The difference in distances between the positions of the user A and the left edges of the windows of the user A shown in FIG. 13A, FIG. 13B, and FIG. 13C shows that the followability of the window shown in FIG. 13C is lower than in other figures.

As the focuses of FIG. 13A to FIG. 13C are on the user A, the followability of the window of the user B varies little from FIG. 13A to FIG. 13C. In the situation shown in FIG. 13C, the followability of the user B may be increased (as a result, the window passes the user B) so as to allow user B to notice that a person is catching up with the user B. Such a presentation may cause the user B to speed up.

In the case shown in FIG. 14A to FIG. 14C, the appropriate-position calculation unit 24 calculates the appropriate distance s by adding a predetermined margin to the width (a) of the window of the user A. It is preferable that the margin in this situation is set larger than in the situation shown in FIG. 13A to FIG. 13C. This is because users in the situation shown in FIG. 14A to FIG. 14C are more aware of each other than those in the situation shown in FIG. 13A to FIG. 13C.

In FIG. 14A and FIG. 14B, the window of the user A follows movement of the user A with normal followability because the distance i between the user A and the work space assigned to the user B is longer than the appropriate distance s. In FIG. 14C, on the other hand, the distance i between the user A and the work space assigned to the user B is shorter than the appropriate distance s; thus the user A is coming closer to the work space of the user B beyond an appropriate position of the user A. Then, the display control unit 25 notifies the user A that the user A is beyond the appropriate position by lowering the followability of the window of the user A. The user A learns the situation by noticing that the window right beside the user A gradually goes behind. A user may slow down when the user notices that the window right beside the user gradually goes behind.

In the configuration described above, an appropriate position of a user is determined at least based on a position relationship between users so as to prevent operation of one user from interfering operation of another user around the one user, and an application to be displayed on the image display unit 31 is controlled based on the appropriate position. Thus, operation of one user is prevented from interfering operation of another user around the one user. Furthermore, in the case where operation of one user may interfere operation of another user around the one user, the one user provided with feedback can notice the situation.

Although the present invention assumes that gestures are made freehand and that positions and gestures of users' hands are detected by analyzing images captured by the user detection camera 11, all or some of the users may make gestures on a touch table provided with an electrostatic touchpad as shown in FIG. 1A. The present invention is also applicable to such a case. Furthermore, the present invention is also applicable to the case where all or some of the users make a gesture using a gesture-input remote control as shown in FIG. 1A.

Although the three cases above show situations where two users, the user A and the user B are working side by side, the present invention is not limited to these situations but also applicable to a situation where the user interface device 10 is used by one user. For example, in a case where one user controls an application through a first work space and a second work space adjacent to the first work space is a system area, the present invention effectively prevents the user from entering the system area.

4. Variations

The following describes variations of the embodiment.

4.1. Determining an Appropriate Position

The appropriate-position calculation unit may determine an appropriate position based on consideration of the following.

(Physical Characteristics)

The appropriate-position calculation unit 24 may determine an appropriate position based on a user's physical characteristic. For example, an appropriate position may be determined based on consideration of a user's body height or length of an arm so as to prevent arms stretched by neighboring users from crossing each other. Furthermore, the appropriate-position calculation unit 24 may determine an appropriate position which is more suitable to a user's physical characteristic by considering whether the user is right-handed or left-handed. Information of such physical characteristics of a user is available from the user information DB. A body height of a user may be calculated by analyzing an image captured by the user detection camera.

(Social Relationship)

An appropriate position may be determined based on consideration of a relationship between neighboring users. The relationship between users to be considered may be a social relationship such as seniority order, a parent and a child, or a boss and a subordinate. The relationship between users may be a subordinate-superior relationship presumed from the amount of utterances.

Alternatively, the appropriate position may be determined based on a degree of friendship between users registered in the user information DB as shown in FIG. 4D.

4.2. Providing Feedback

The embodiment above is described based on the assumption that the user interface device 10 provides a user with feedback by controlling an indication on the screen. The user interface device 10 may provide feedback using methods described below.

(Sound)

The user interface device 10 may provide a user with feedback by emitting a sound from a speaker (illustration omitted) of the user interface device 10 depending on a deviation between a position of the user and an appropriate position.

(Illumination)

The user interface device 10 may provide a user with feedback by changing illuminance or color of illumination in a space where the user interface device 10 is installed, depending on a deviation between a position of the user and an appropriate position.

(Mobile Device)

In the case where the user interface device 10 is network-connected to a mobile device carried by a user, the user interface device 10 may provide the user with feedback through the mobile device. For example, vibration of the mobile device may be made stronger depending on a deviation between a position of the user and an appropriate position.

The sound, the illumination, and the mobile device described above may be used for feedback in combination.

(Supplement)

While the user interface device according to the present invention has been described on a basis of the embodiment above, it should be understood that the present invention is not limited to the user interface device described in the embodiment and may be embodied as variations described below.

(1) Each of the apparatuses described above is specifically a computer system including a microprocessor, a ROM, a RAM, a hard disk unit, a display unit, a keyboard, and a mouse. In the RAM or the hard disk unit, a computer program is stored. Operation of the microprocessor according to the computer program allows the apparatus to perform its function. The computer program includes instruction codes which indicate commands to the computer and are combined in order to perform intended functions. The apparatus is not limited to such a computer system including a microprocessor, a ROM, a RAM, a hard disk unit, a display unit, a keyboard, and a mouse, but may be a computer system which includes some of these components.

(2) All or some of the components that constitute the apparatus above may be implemented on a single system large-scale integration (LSI) which is an integrated circuit. The system LSI is a super-multifunctional LSI manufactured by integrating constituent units on one chip, and is specifically a computer system including a microprocessor, a ROM, and a RAM. In the RAM, a computer program is stored. Operation of the microprocessor according to the computer program allows the system LSI to perform its function.

The integrated circuit described as a system LSI above may be referred to as an IC, an LSI, a super LSI or an ultra LSI depending on the degree of integration. The method of forming integrated circuitry is not limited to use of an LSI. Dedicated circuitry or a general-purpose processor may be used instead of an LSI. Also applicable is a field programmable gate array (FPGA), which allows post-manufacture programming, or a reconfigurable processor LSI, which allows post-manufacture reconfiguration of connection and setting of circuit cells therein.

Furthermore, in the event that an advance in or derivation from semiconductor technology brings about an integrated circuitry technology whereby an LSI is replaced, functional blocks may be obviously integrated using such new technology. The application of biotechnology or the like is possible.

(3) All or some of the components that constitute the apparatus above may be implemented on an IC card or a unit module which is attachable to the apparatus. The IC card and the module is each a computer system including a microprocessor, a ROM, and a RAM. The IC card and the module may include the super-multifunctional LSI described above. Operation of the microprocessor according to the computer program allows the IC card or the module to perform its function. The IC card and the module may be tamper-resistant.

(4) The present invention may be implemented as a method. Furthermore, the present invention may be implemented as a computer program which performs the method on a computer or a digital signal indicating the computer program.

Furthermore, the present invention may be implemented as the computer program or the digital signal recorded on a computer-readable recording medium, such as a flexible disc, a hard disc, a CD-ROM, an MO, a DVD, a DVD-ROM, a DVD-RAM, a Blu-ray Disc (BD), a semiconductor memory, or the like. Furthermore, the present invention may be implemented as the computer program or the digital signal recorded on the recording medium.

Furthermore, the present invention may be the computer program or the digital signal transmitted via an electric telecommunication line, wire or wireless communication line, a network represented by the Internet, or data broadcasting.

Furthermore, the present invention may be implemented as a computer system including a micro processor and a memory. The memory stores the computer program, and the microprocessor operates according to the computer program.

Furthermore, the program or the digital signal may be recorded on the recording medium and transmitted, or transmitted via the network to be executed on a different independent computer system.

(5) The embodiment and the variations described above may be selected and combined.

[Industrial Applicability]

The user interface device according to the present invention controls display in the case where plural users operates on the user interface device, so that operation of one user does not interfere operation of another user. Thus, the user interface device according to the present invention is applicable to a large-screen display operated by plural users, such as a large-screen TV or an outdoor electric advertising display (digital signage).

[Reference Signs List]

1, 10 User interface device
2 Display unit
3 Detection unit
4 Calculation unit
5 Notification unit
11 User detection camera
21 User identification unit
22 User-position detection unit
23 User-movement detection unit
24 Appropriate-position calculation unit
25 Display control unit
31 Image display unit

The invention claimed is:

1. A user interface device which provides a user with a work space which serves as an interface through which the user controls an application program, said user interface device comprising:
 a display unit configured to display a first work space and a second work space, the first work space being assigned to the user, and the second work space being different from the first workspace;
 a detection unit configured to detect a position of the user;
 a calculation unit configured to calculate an appropriate distance between the user and the second work space, according to a type of the application program controlled by the user through the first work space; and
 a notification unit configured to notify the user that a distance between the position of the user detected by said detection unit and the second work space is shorter than the appropriate distance calculated by said calculation unit,
 wherein said calculation unit is further configured to calculate the appropriate distance according to a physical characteristic of the user so that the appropriate distance is longer when a hand of the user closer to the second work space is a dominant hand of the user than when a hand of the user farther from the second work space is a dominant hand of the user.

2. A user interface device which provides a user with a work space which serves as an interface through which the user controls an application program, said user interface device comprising:
- a display unit configured to display a first work space and a second work space, the first work space being assigned to the user, and the second work space being different from the first workspace;
- a detection unit configured to detect a position of the user;
- a calculation unit configured to calculate an appropriate distance between the user and the second work space, according to a type of the application program controlled by the user through the first work space; and
- a notification unit configured to notify the user that a distance between the position of the user detected by said detection unit and the second work space is shorter than the appropriate distance calculated by said calculation unit,
- wherein said calculation unit is further configured to calculate the appropriate distance so that the appropriate distance is shorter when the application program controlled by the user through the first work space and an application program controlled by another user through the second work space are more similar or more relevant.

3. A user interface method which uses a display unit displaying a first work space and a second work space so as to allow a user to control an application program through the first work space, the first work space being assigned to the user, and the second work space being different from the first workspace, said user interface method comprising:
- detecting a position of the user;
- calculating an appropriate distance between the user and the second work space according to a type of the application program controlled by the user through the first work space; and
- notifying the user that the distance between the position of the user detected in said detecting and the second work space is shorter than the appropriate distance calculated in said calculating,
- wherein said calculating further comprises calculating the appropriate distance according to a physical characteristic of the user so that the appropriate distance is longer when a hand of the user closer to the second work space is a dominant hand of the user than when a hand of the user farther from the second work space is a dominant hand of the user.

4. A non-transitory computer-readable recording medium on which a program causing a computer to execute the method according to claim 3 is recorded.

5. A user interface method which uses a display unit displaying a first work space and a second work space so as to allow a user to control an application program through the first work space, the first work space being assigned to the user, and the second work space being different from the first workspace, said user interface method comprising:
- detecting a position of the user;
- calculating an appropriate distance between the user and the second work space according to a type of the application program controlled by the user through the first work space; and
- notifying the user that the distance between the position of the user detected in said detecting and the second work space is shorter than the appropriate distance calculated in said calculating,
- wherein said calculating further comprises calculating the appropriate distance so that the appropriate distance is shorter when the application program controlled by the user through the first work space and an application program controlled by another user through the second work space are more similar or more relevant.

6. A non-transitory computer-readable recording medium on which a program causing a computer to execute the method according to claim 5 is recorded.

\* \* \* \* \*